United States Patent [19]

Jabour et al.

[11] Patent Number: 4,770,638

[45] Date of Patent: Sep. 13, 1988

[54] EDUCATIONAL AID HAVING AN ANSWER CONCEALING ELEMENT

[76] Inventors: Mary S. M. Jabour, 233 McAuley Dr.; Elizabeth S. May, P.O. Box 1744, both of Vicksburg, Miss. 39180

[21] Appl. No.: 929,398

[22] Filed: Nov. 10, 1986

Related U.S. Application Data

[63] Continuation-in-part of Ser. No. 843,293, Mar. 24, 1986, abandoned.

[51] Int. Cl.⁴ .............................................. G09B 3/00
[52] U.S. Cl. ..................................... 434/348; 434/191
[58] Field of Search .............. 434/348, 347, 345, 349, 434/167, 322, 327, 365, 432, 191; 273/149 R

[56] References Cited

U.S. PATENT DOCUMENTS 2,222,245  11/1940  Steen ..................................... 434/348
2,287,943  6/1942  O'Sullivan .......................... 434/167
3,143,348  8/1964  Carsen et al. .................. 434/347 X
4,377,383  3/1983  Meyers ............................. 434/348

*Primary Examiner*—William H. Grieb
*Attorney, Agent, or Firm*—Keaty & Keaty

[57] ABSTRACT

An educational aid comprises a display device for holding a plurality of information-bearing elements in an upright position. Each information-bearing element has a question and an answer on a first face thereof. The display device reveals the question to a user of the educational aid while concealing the answer. The user views the question and formulates an answer. He then removes the information-bearing element from the display device, and the question and the answer are revealed simultaneously. This allows him to easily mentally associate the question with the proper answer.

Displaying the information-bearing elements in an upright position allows a number of students to simultaneously use the educational aid.

12 Claims, 3 Drawing Sheets

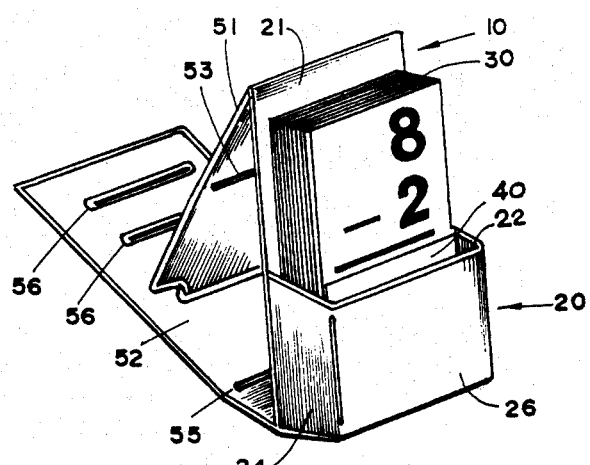
FIG. 1
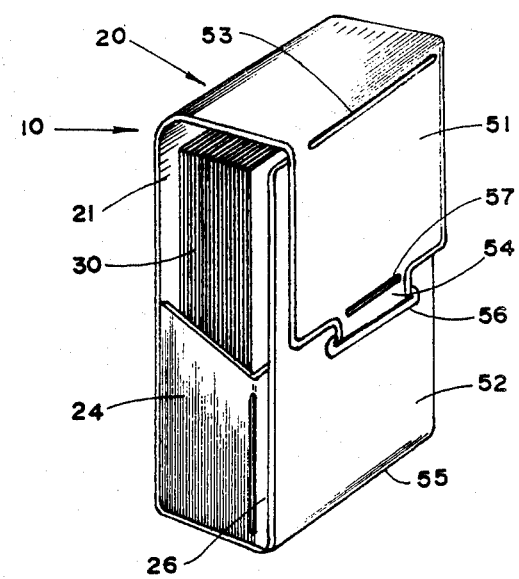
FIG. 2
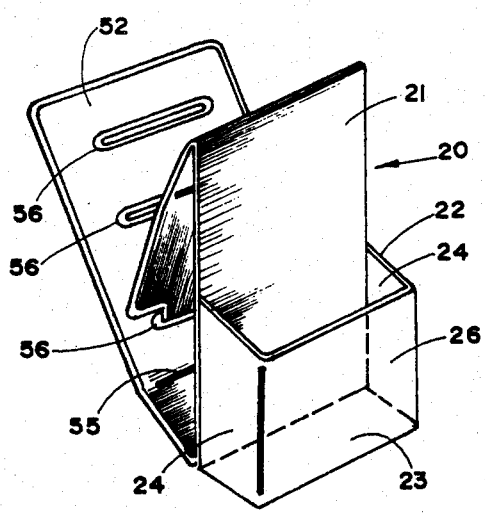
FIG. 3
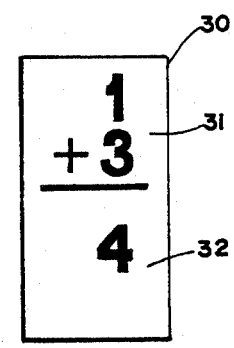
FIG. 4
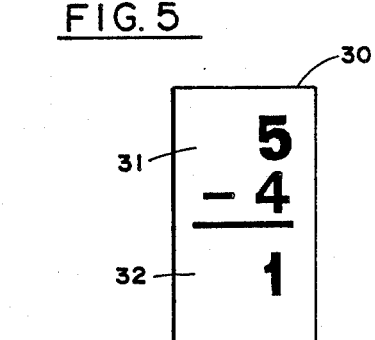
FIG. 5
FIG. 6
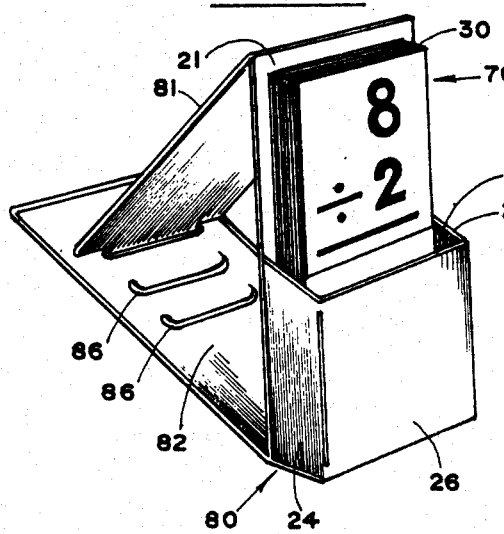
FIG. 7
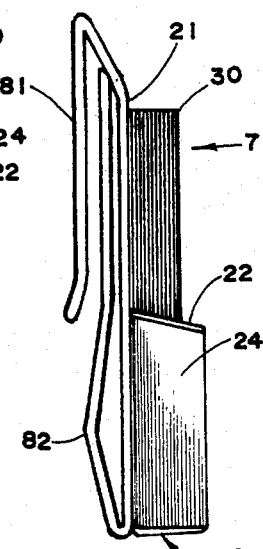
FIG. 8
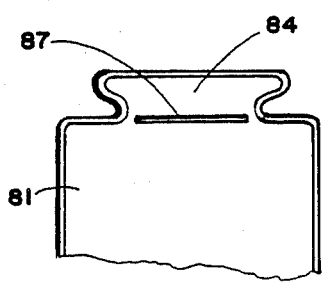
FIG. 9

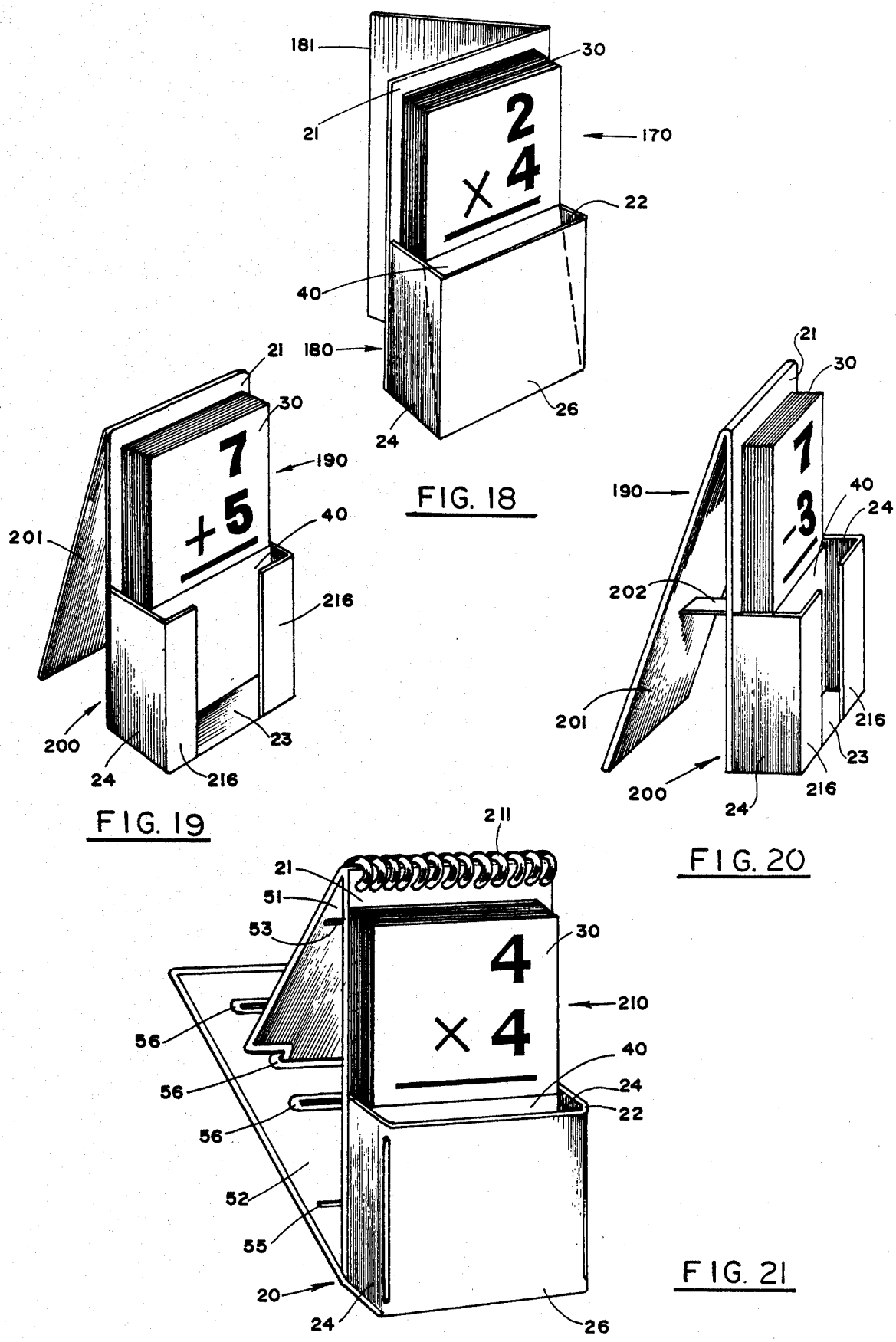

EDUCATIONAL AID HAVING AN ANSWER CONCEALING ELEMENT

CROSS-REFERENCE TO RELATED APPLICATION

This is a continuation-in-part of copending application Ser. No. 843,293, filed Mar. 24, 1986, now abandoned, the disclosure of which is hereby incorporated by reference.

BACKGROUND OF THE INVENTION

1. Field of the Invention

The present invention relates to educational aids and, more particularly, to flash cards and the like.

2. General Background of the Invention

Flash cards are useful learning aids which are in wide use today in schools and in homes. Flash cards typically have a question on one face of the card and an answer on the other. The question face of the card is revealed to a student who tries to determine the answer. Once he has had time to formulate an answer, the card is flipped over, allowing him to view the answer on the back of the card. While flash cards having a question on one face of the card and an answer on the other have helped many children learn arithmetic and other subjects, it is often preferable to display the question and answer at the same time to allow a student to easily mentally associate the answer with the question.

U.S. Pat. No. 4,377,383 discloses a teaching apparatus including a number of slips having a question and an answer on the same face of the slip. The slips are stacked face-up on a raised platform, and a cover is placed over the stack of slips and the platform. The cover has a window to allow the question, but not the answer, to be revealed to the user. The user views the question, formulates an answer, then removes the slip from beneath the cover to view the answer. This process is repeated and, as the slips are removed, the cover descends. When the user has seen all of the slips, the cover rests on the platform.

While this apparatus is in some ways more advantageous then traditional flash cards in that the question and answer are revealed at the same time to a user when a slip is removed from the stack, it is disadvantageous in that the slips are viewed in a horizontal position, making them difficult to see when the user is sitting at a table on which the apparatus rests. Furthermore, the horizontal orientation of the slips, when the teaching apparatus is in use, essentially limits the number of people who can simultaneously use the teaching apparatus to the number of people who can sit around a table on which it is placed.

SUMMARY OF THE INVENTION

The present invention comprises an educational aid which includes a plurality of information-bearing elements, each element having a question and an answer on a first face thereof, the question being located on a first portion of the element, and the answer being located on a second portion of the element. Display means are provided to hold the elements in a substantially upright position and to display the question. Covering means are provided to cover the answer. Displaying the information-bearing elements in an upright position is particularly advantageous in that the educational aid may be placed on a desk and may be easily viewed by a student sitting at the desk, or it may be placed on a table in the front of a classroom or may be hung in an upright position on a front wall of a classroom, and may be easily viewed simultaneously by a number of students in the classroom. In preferred embodiments of the present invention, adjusting means are provided to allow the information-bearing elements to be held in a substantially upright position on sloped surfaces.

The educational aid is set up such that the information-bearing elements are in an upright position. The student views the question which is revealed on the first information-bearing element and formulates an answer. The information-bearing element is then removed from the covering means to display both the question and the answer simultaneously to the student. If he has formulated the correct answer, this reaffirms his choice. If not, he studies the information-bearing element in order to associate the question with the proper answer. The student then views the question on the second information-bearing element, and proceeds with the educational exercise.

The covering means preferably comprises a pocket means which is dimensioned such that it covers the second but not the first portion of the information-bearing elements. The covering means may comprise an insert means having dimensions substantially equal to the dimensions of the second portion of the information-bearing element. This insert means may be used in conjunction with or instead of the above-mentioned pocket means, and may be removable. The insert means covers the answer of the information-bearing element regardless of the number of information-bearing elements in the display means or the angle at which the information-bearing elements are viewed.

It is an object of the present invention to provide an educational aid having information-bearing elements wherein each information-bearing element has a question and an answer on a first face thereof, having means to cover the answer of the information-bearing element while displaying the question, and which can be easily used by a number of students simultaneously.

It is also an object of the present invention to provide an educational aid having information-bearing elements, each information-bearing element having a question and an answer on a first face thereof, having means to display the information-bearing elements in an upright position, and having means to cover the answer on the information-bearing elements while displaying the question.

It is a further object of the present invention to provide an educational aid including information-bearing elements, and having adjusting means to allow the information-bearing elements to be displayed in a substantially upright position on sloped surfaces (such as standard school desks).

It is yet another object of the present invention to provide an educational aid of the type described and further having a means to cover the answer irrespective of the number of information-bearing elements in the educational aid or the angle at which the educational aid is viewed.

BRIEF DESCRIPTION OF THE DRAWINGS

For further understanding of the nature, objects and advantages of the present invention, reference should be had to the following detailed description, taken in conjunction with the accompanying drawings in which like reference numerals denote like elements, and wherein:

FIG. 1 is a perspective view of the preferred embodiment of the educational aid of the present invention in an operational position.

FIG. 2 is a perspective view of the preferred embodiment of the present invention in a closed position.

FIG. 3 is a perspective view of the display means shown in FIG. 1.

FIG. 4 is a front view of an information-bearing element in accordance with the present invention.

FIG. 5 is a front view of an insert means in accordance with the present invention.

FIG. 6 is a front view of an alternative embodiment of an information-bearing element in accordance with the present invention.

FIG. 7 is a perspective view of an alternative embodiment of the educational aid of the present invention.

FIG. 8 is a side view of the embodiment shown in FIG. 7, with the support members in a folded position.

FIG. 9 is a detail view of a support member of the embodiment shown in FIGS. 7 and 8.

FIG. 18 is a perspective view of a sixth embodiment of the educational aid of the present invention.

FIGS. 19 and 20 are perspective views of a seventh embodiment of the educational aid of the present invention.

FIG. 21 is a perspective view of an eighth embodiment of the educational aid of the present invention.

DETAILED DESCRIPTION OF THE PREFERRED EMBODIMENT

Figure 10:
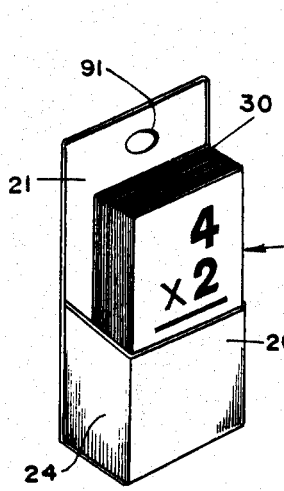
FIG. 10 is a perspective view of a third embodiment of the educational aid of the present invention.

Referring now to the drawings, the preferred embodiment of the present invention is shown in FIG. 1 with numeral 10 designating the educational aid device. Educational aid 10 comprises a display means 20, a plurality of information-bearing elements 30, and an insert means 40. Display means 20 also functions as a carrying case for information-bearing elements 30 when educational aid 10 is not in use (FIG. 2).

Information-bearing elements 30 (FIG. 4) have a question on an upper portion 31 of a first face thereof, and an answer on a lower portion 32 of the first face. While, for convenience, the information-bearing elements 30 shown in the drawings contain information about mathematics, the information displayed thereon could relate to history, foreign languages, or virtually any subject. The "question" could be, for example, a French word and the "answer" could be the English equivalent of that word. The answer is displayed immediately below the question on the information-bearing element shown in FIG. 4 because this is the format with which most children are familiar. It is sometimes desirable, however, to space the answer from the question, as shown in FIG. 6, as will be described below.

Insert means 40 is substantially the same height and width as the lower portion 32 of information-bearing element 30. The purpose of insert means 40 will be described hereinafter.

Display means 20 has a quadrilateral back member 21 and a pocket means 22 for receiving information-bearing elements 30. Pocket means 22 comprises a quadrilateral bottom member 23, quadrilateral side members 24 and a quadrilateral front member 26. A first support member 51 is pivotally attached, at a first end thereof, to a first end of back member 21, if bendable at crease 53, and has a tab 54 (FIG. 2) adjacent a second end thereof. A crease 57 adjacent tab 54 allows tab 54 to bend when display means 20 is set up. A second, quadrilateral support member 52 is pivotally attached at a first end thereof to a second end of back 21, is bendable at crease 55, and has a plurality of slots 56 therein. Support members 51 and 52 are substantially equal in width to each other and to back member 21.

When educational aid 10 is not in use, display means 20 is closed, as shown in FIG. 2. Support member 52 covers bottom member 23 and front member 26 of pocket means 22. First support member 51 covers the upper end and front of information-bearing elements 30, and tab 54 is inserted into one of slots 56 of support member 52, releasably locking support members 51 and 52 together.

When educational aid 10 is to be used, display means 20 is set up as shown in FIG. 1, with tab 54 of support member 51 engaged in one of slots 56 of support member 52. Tab 54 and the plurality of slots 56 serve as an adjusting means to allow information-bearing elements 30 to be displayed in a substantially upright position on a variety of sloped surfaces. When display means 20 is set up on a horizontal surface, tab 54 is engaged in the slot 56 closest to pocket 22, as shown in FIG. 1. One of the other slots 56 is used when the display means 20 is set up on a surface which slopes downward toward the user.

Once display means 20 is set up such that information-bearing elements 30 are in a substantially upright position (but preferably tilted slightly backward, the reason for which will be explained hereinafter), a student views the question on the first information-bearing element and formulates an answer. He then pulls the first information-bearing element 30 out of display means 20, and immediately learns whether or not his answer was correct. If it is, he places the information-bearing element aside. If not, he places the information-bearing element back in display means 20, behind the other information-bearing elements, so that he will come across it again. As he learns the answers to more and more questions posed on information-bearing elements 30 and removes those information-bearing elements, the front of the stack of information-bearing elements 30 gets further from the front member 26 of pocket means 22. Insert means 40, due to the slight backward tilt of back 21 of display means 20, moves backward as the thickness of the stack of information-bearing elements decreases, and thus continues to cover the answer on the front information-bearing element of the stack.

When the user is viewing the information-bearing elements from such an angle that front member 26 prevents the user from seeing the lower portion of the information-bearing element, or when the answer is low enough on information-bearing element 30 (see FIG. 6) such that front member 26 of pocket means 22 prevents the user from seeing the answer, pocket means 22 alone is sufficient to prevent the user from seeing the answer on information-bearing element 30, and insert means 40 may be omitted.

The embodiment of the invention shown in FIGS. 7-9, educational aid 70, is similar to educational aid 10. In this embodiment, a first support member 81 is pivotally attached at a first end thereof to a first end of back member 21, and has a tab 84 (FIG. 9) adjacent a second end thereof. A crease 87 adjacent tab 84 allows tab 84 to bend when display means 80 is set up. A second support member 82 is pivotally attached at a first end thereof to a second end of back member 21, and has a plurality of slots 86 therein. Support members 81 and 82 are folded against back member 21 (FIG. 8) to facilitate transportation and storage of educational aid 70. When educational aid 70 is to be used, display means 80 is set up as shown in FIG. 7, with tab 84 of support member 81 engaged in one of slots 86 of support member 82.

Educational aid 90, shown in FIG. 10, has a hole 91 adjacent the upper end of back member 21 to allow it to be hung, for example, on a wall or a bulletin board in a classroom. Educational aid 90 could simply stand on a horizontal surface (although it would not be as stable as educational aids 10 or 70) in which case hole 91 could be omitted.

Figure 11:
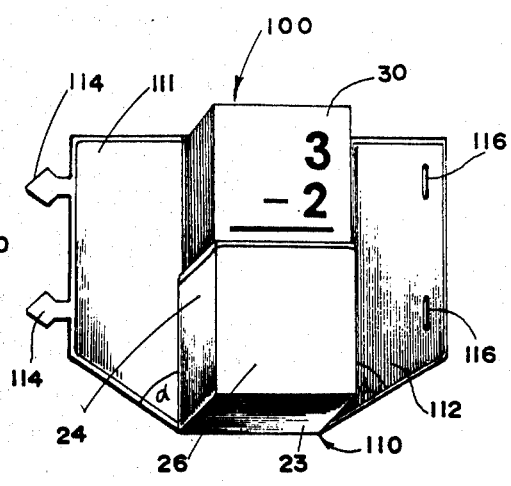
FIGS. 11 and 12 are perspective views of a fourth embodiment of the educational aid of the present invention.
Figure 12:
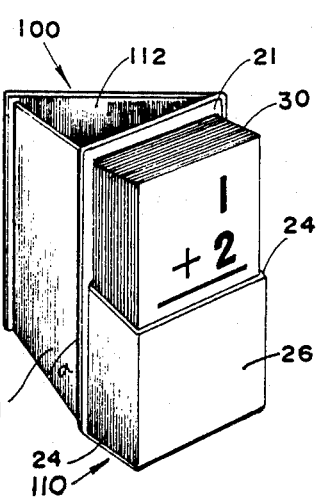

Educational aid 100, comprising display means 110, is shown in FIGS. 11 and 12. A first support member 111 is pivotally attached at a first side thereof to a first side of back member 21. Tabs 114 are disposed adjacent the second side of support member 111. A second support member 112 is pivotally attached at a first side thereof to a second side of back member 21, and has slots 116 disposed adjacent the second side thereof. Support members 111 and 112 are substantially equal in width and height to back member 21, and are folded flat against back member 21 when display means 110 is not in use. Support member 111 is shaped such that the angle "a" between the first side thereof and the lower end thereof is acute; support member 112 is similarly shaped. The shape of support members 111 and 112 allows back member 21 to be tilted slightly backward when educational aid 100 is set up as shown in FIG. 12, with tabs 114 of support member 111 engaged in slots 116 of support member 112.

Figure 13:
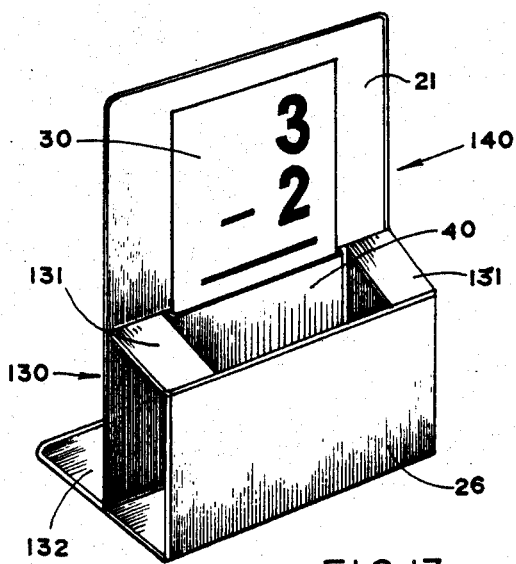
FIGS. 13 and 14 are perspective views of a fifth embodiment of the educational aid of the present invention.
Figure 14:
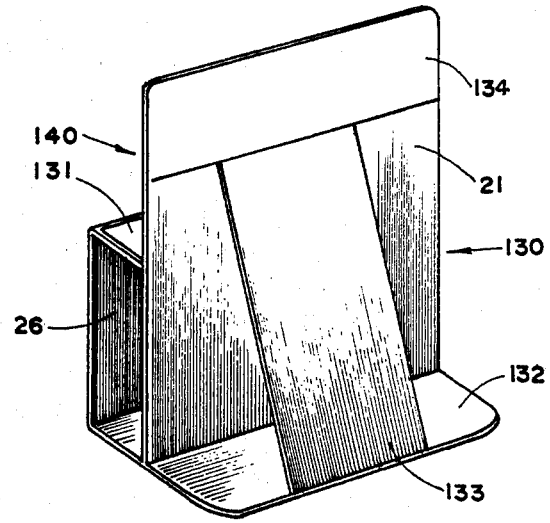
Figure 15:
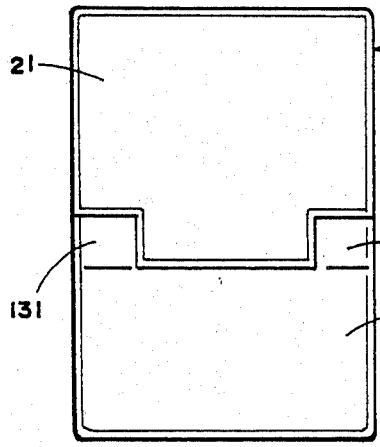
FIGS. 15 and 16 are plan views of the front and back, respectively, of the display means, of the educational aid shown in FIGS. 13 and 14, in a folded position.
Figure 16:
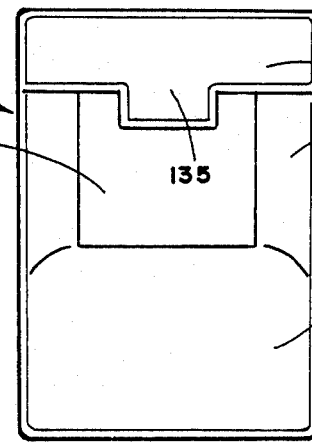
Figure 17:
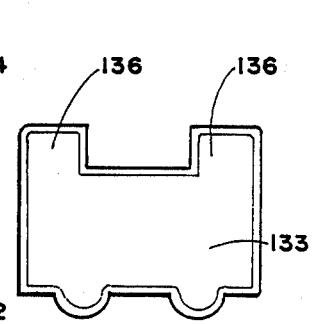
FIG. 17 is a detail view of the display means shown in FIGS. 13-16.

Display means 130 of educational aid 140, illustrated in FIGS. 13-16, has a pair of horizontal members 131, each pivotally connected at a first end to back member 21, and at a second end to front member 26. A first support member 132 is pivotally connected at a first end thereof to the lower end of front wall 26 and at a second end thereof to a first end of a second support member 133, and intermediate its first and second ends to back member 21. Second support member 133 has tabs 136 (FIG. 17) adjacent a second end thereof. Back member 21 has a sleeve 134 (FIGS. 14 and 16) thereon, which is closed at its top end and sides, open on its lower end, and has a tab 135 adjacent its lower end. When display means 130 is not in use, it is folded flat as shown in FIGS. 15 and 16, with the second end of support member 133 received in sleeve 134. When it is to be used, display means 130 is set up as shown in FIG. 13 and 14, with the second end of support member 133 over tab 135 of sleeve 134, and tabs 136 of support member 133 received within sleeve 134.

Another embodiment of the present invention, educational aid 170 (FIG. 18) comprises a display means 180 having a support member 181 pivotally attached at a first side thereof to a first side of back member 21. Support member 181 is substantially equal in height and width to back member 21, and may be folded against back member 21 when educational aid 170 is not in use. Insert means 40 is pivotally connected at its lower edge to the lower end of front member 26, and its upper end leans toward back member 21 as information-bearing elements 30 are removed from pocket means 22.

In display means 200 of educational aid 190 (FIGS. 19 and 20), a support member 201 is pivotally attached to the upper end of back member 21, and is substantially equal in dimension to back member 21. A flexible connecting means 202 interconnects support member 201 and back member 21, and serves to limit relative movement between back member 21 and support member 201 when educational aid 190 is set up. Support member 201 folds against back member 21 when educational aid 190 is not in use. In educational aid 190, there is no front wall - insert 40 serves as the sole means to cover the lower portion of information-bearing elements 30. Optional front members 216 may be provided to prevent information-bearing elements 30 from falling forward out of display means 200 when display means 200 is not set up.

Educational aid 210 (FIG. 21) is substantially identical to educational aid 10, the only difference being a binding means 211 which loosely binds together information-bearing elements 30. Binding means 211 passes through information-bearing elements 30 adjacent their upper ends, passes through back member 21 adjacent its first end, and passes through support member 51 adjacent its first end. The longitudinal axis of binding means 211 is coaxial with the first end of back member 21 and the first end of support member 51, in order not to interfere with pivotal movement of support member 51 relative to back member 21.

Educational aid 210 is well suited for young children and other students who may have problems with coordination. Binding means 211 ensures that information-bearing elements 30 are always right-side up, and prevents individual information-bearing elements 30 from getting lost. When used in educational aid 210, information-bearing elements are preferably made of a flexible material, such as paper or thin plastic, so that information-bearing elements can be easily removed from pocket means 22. In use, educational aid 210 is set up as shown in FIG. 21. A student reads the question on the upper portion of the first information-bearing element 30, and formulates an answer. He then pulls information-bearing element 30 out of pocket means 22 to reveal the answer. Once he has had a chance to study information-bearing element 30, if his answer was incorrect, he flips the first information-bearing element 30 over such that it rests on support member 51. After he has viewed all information-bearing elements 30, all information-bearing elements 30 rest on support member 51. Front wall 26 could be removable (for example, it could fit in slots or grooves in side members 24) or hingedly attached such that it could be moved out of the way to facilitate placing the entire stack of information-bearing elements 30 again in pocket 22. Alternatively, front member 26 could be omitted entirely, as long as insert means 40 is used to cover the answer on information-bearing elements 30.

The display means in the various embodiments of the present invention may be made of any suitable material, such as cardboard, plastic, or reinforced vinyl. The information-bearing elements may be made of, for example, paper, cardboard, plastic or vinyl, and may be black and white or colored. The bonding means shown in FIG. 21 is preferably metal ringed binding, but may comprise any suitable holding which would serve the intended purpose.

Means other than tabs and slots could be used to secure the support members together; for example, the support members could be secured together with snap fasteners or resilient hook and loop fasteners (such as those sold under the trademark Velcro). Means could be added to display the question and the answer simultaneously in the display means. For example, the back member and the support members of the embodiment shown in FIGS. 1–3 could be made approximately twice as wide as the width of the information-bearing elements, and a holder could be included next to the pocket means to display the information-bearing elements when they are removed from the pocket means. The front of the holder would preferably be low enough to simultaneously reveal the question and the answer of the information-bearing elements.

The question could be on a first side of a first face of the information-bearing element, and the answer could be on the second side of the first face, and the information-bearing elements could be displayed in an upright position in a display means having a covering means which covers the answer but not the question. Also, each information-bearing element could have two questions and answers, with a question and an answer on each face of the information-bearing element. The support members could be rigidly attached to each other and the back member such that the display means is permanently in a set-up position. Furthermore, the display means could be detachable from the support member such that the display means could be used independently of the support members. In view of these and other changes which could be made to the embodiments described herein, we hereby pray that our rights to the present invention be limited only by the following claims.

We claim:

1. An educational aid for use with at least one information-bearing element, the information-bearing element having a question and an answer on a first face thereof, said educational aid comprising:
   a display means comprising a holding means for holding said information-bearing element, the holding means comprising a back member and a bottom member attached to said back member, and a support means securely attached to and extending from said back member, said support means being adapted for retaining the holding means in a substantially upright position during display of the information-bearing element allowing display of the information-bearing element in a substantially upright position; and
   means for concealing the answer while displaying the question of the information-bearing element.

2. An educational aid, comprising:
   a plurality of information-bearing elements, each information-bearing element having a question and an answer on a first face thereof, said question being positioned on a first portion of said first face, said answer being positioned on a second portion of said first face;
   displaying means for displaying said plurality of information-bearing elements in a substantially upright position, said display means comprising a holding means for holding said information-bearing elements and a support means for supporting said holding means in a substantially upright position, said holding means comprising a back member and a bottom member attached to said back member; and
   means for covering said answer while displaying said question, comprising:
      at least one side member, having a height substantially equal to that of the second portion of the information-bearing elements, attached to said back member and said bottom member; and
      a front member, having a height and width substantially equal to that of the second portion of the information-bearing elements, attached to said bottom member and said side member.

3. The educational aid of claim 2, wherein said covering means further comprises:
   an insert substantially equal in height and width to said second portion of the information-bearing elements.

4. The educational aid of claim 3, wherein said insert is removable.

5. The educational aid of claim 3, wherein said insert is pivotally attached at a lower edge thereof to a lower end of said front member.

6. The educational aid of claim 2, wherein said support means comprises a first support member pivotally attached to an upper end of said back member.

7. The educational aid of claim 6, wherein said support means further comprises:
   a second support member pivotally attached to a bottom end of said back member; and
   means to interconnect said first support member with said second support member.

8. The educational aid of claim 2, wherein said support means comprises a first support member pivotally attached to a first edge of said back member.

9. The educational aid of claim 2, wherein said means for covering the answer comprises an insert means having a height substantially equal to that of the second portion of the information-bearing elements.

10. The educational aid of claim 2, wherein said information-bearing elements are bound together adjacent an upper end of each information-bearing element.

11. An educational aid comprising:
   a plurality of information-bearing elements, each information-bearing element having a question and an answer on a first face thereof, said question being positioned on an upper portion of said information-bearing element, said answer being positioned on a lower portion of said information-bearing element;
   display means, for displaying said information-bearing elements in a substantially upright position, comprising a back member, having a height and width substantially equal to that of the information bearing elements, and a bottom member substantially equal in width to the information-bearing elements;
   a covering means, for covering said answer while displaying said question, comprising a front member having a height substantially equal to that of the lower portion of the information-bearing elements and a width substantially equal to that of the information-bearing elements, and two side members each having a height substantially equal to that of the lower portion of the information-bearing elements;

a first support member pivotally attached at a first end thereof to an upper end of said back member;

a second support member pivotally attached at a first end thereof to a lower end of said back member;

means to engage a second end of said first support member with said second support member to support said display means in a substantially upright position;

means to fold said second support member over said bottom member and said front member; and means to fold said first support member over upper ends and the front face of said information-bearing elements, wherein said second support member is adapted to allow said second end of said first support member to engage said second support member to releasably lock said display means in a closed position.

12. The educational aid of claim 11, wherein said means to engage the second end of said first support member with said second support member comprises a tab adjacent the second end of said first support member and a plurality of slots in said second support member.

* * * * *